United States Patent [19]

Seabloom et al.

[11] 4,383,792
[45] May 17, 1983

[54] CRANE FOR DETACHABLE MOUNTING ON A TRUCK BED

[75] Inventors: Clark G. Seabloom, Paonia; Lawrence C. Post, Aurora, both of Colo.

[73] Assignee: Clark G. Seabloom, Paonia, Colo.

[21] Appl. No.: 183,314

[22] Filed: Sep. 2, 1980

[51] Int. Cl.³ .............................................. B60P 3/12
[52] U.S. Cl. .................................. 414/563; 280/402; 212/182
[58] Field of Search ............. 414/563, 696, 680; 248/122, 193; 280/402; 403/113; 212/180, 179, 177, 255, 257, 242, 262, 187, 188, 182, 265, 244, 152, 222, 258; 254/124, 8 R, 8 B, 325, 326, 334

[56] References Cited

U.S. PATENT DOCUMENTS

| | | | |
|---|---|---|---|
| 410,371 | 9/1889 | Moore | 212/262 |
| 2,283,443 | 5/1942 | Klein | 414/563 X |
| 2,481,223 | 9/1949 | Johnson | 414/563 |
| 2,509,435 | 5/1950 | Huttinger | 414/563 X |
| 2,733,817 | 2/1956 | Couse | 212/182 |
| 2,772,790 | 12/1956 | Kauffman | 212/267 |
| 2,814,394 | 11/1957 | Witcher | 254/124 |
| 3,281,160 | 10/1966 | Vinther et al. | 280/767 |
| 3,883,020 | 5/1975 | Dehn | 414/563 |
| 3,888,368 | 6/1975 | Hawkins | 414/563 |
| 3,918,592 | 11/1975 | Paul | 414/563 |

OTHER PUBLICATIONS

Bantam-4000, Seabloom et al.

*Primary Examiner*—John J. Love
*Assistant Examiner*—L. E. Williams
*Attorney, Agent, or Firm*—Wm. Griffith Edwards

[57] ABSTRACT

A detachable crane or hoist for mounting on the bed of a pickup truck or other vehicle is constructed from tubular members of square cross section. The structure is readily secured to the truck bed and the boom may be extended to selected lengths with guy lines arranged for the length selected. The boom is pivotally mounted on a roller mounted base and is easily erected and dismantled. A post or column is provided to guide the boom during vertical movement and is extendable to provide raised positions for guy lines and for the hoisting cable. A removable stop on the post provides a secure rest for the boom in its collapsed and lowered position. Short anchoring bars horizontally adjustable in sleeves secured to the rearward end of the structure are used for securing the structure to the truck bed. These bars may be replaced by long bars fitting the same sleeves and also sleeves in the forward end of the structure. The long bars are effective for facilitating removal of the crane from the truck.

11 Claims, 9 Drawing Figures

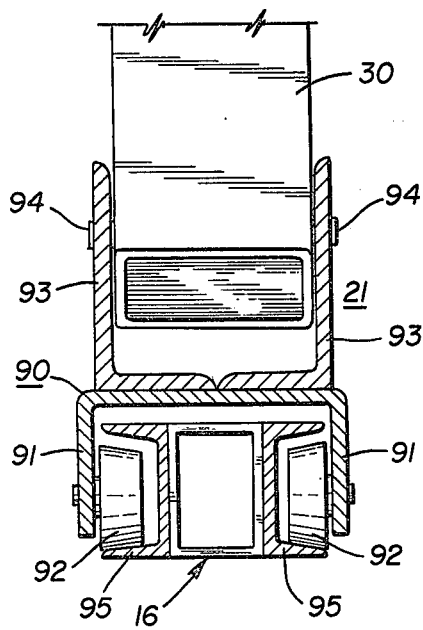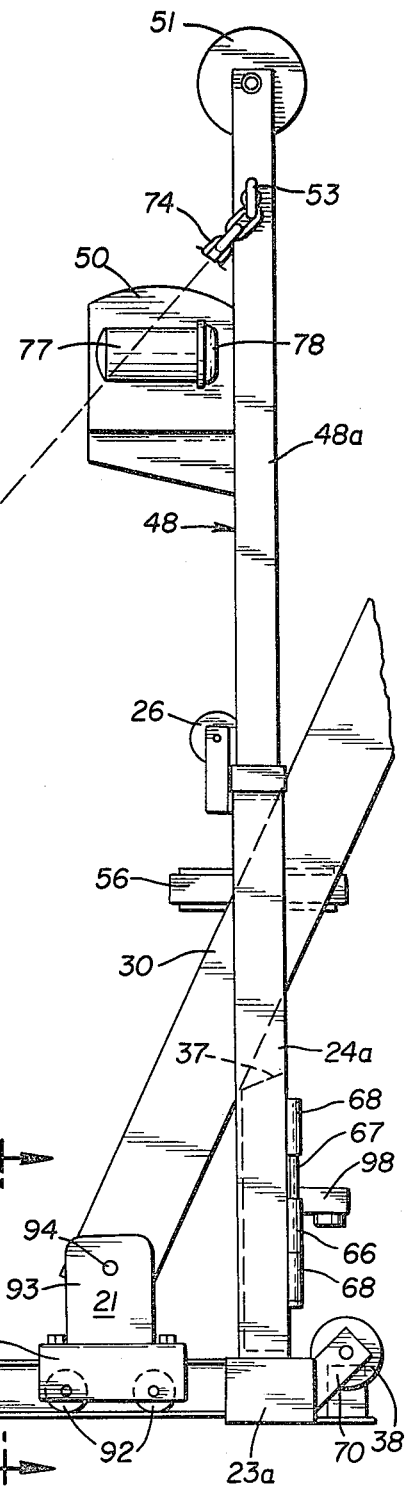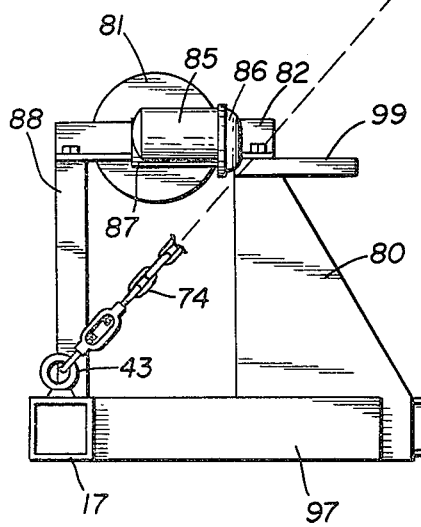

CRANE FOR DETACHABLE MOUNTING ON A TRUCK BED

This invention relates to cranes or hoists adapted to be mounted on pickup trucks and the like and particularly to a detachable crane including an improved arrangement for facilitating the erection, taking down and transporting of the crane boom.

BACKGROUND OF THE INVENTION

Pickup trucks have proved highly useful for transporting a wide range of products, equipment and other types of loads. Some owners of these trucks have need for cranes or hoisting equipment for occasional requirements, but prefer not to purchase a separate vehicle and hoisting equipment assembly. Various arrangements have, therefore, been proposed and provided for cranes or other hoisting equipment to be mounted temporarily on the truck for such occasional requirements. These detachable crane mounting arrangements have, in general, included a base and means for securing the base in position on the truck bed or body and a vertically swingable hoist together with guy cables or other devices for selecting and maintaining the position of the crane boom. It is desirable to provide detachable crane apparatus for pickup trucks and the like which are easily installed and easy to adjust and to operate; accordingly, it is an object of this invention to provide a detachable crane assembly for pickup trucks and the like including an improved arrangement for securing and adjusting the crane boom.

It is a further object of this invention to provide an improved and simple crane assembly for detachable mounting on pickup trucks and the like.

It is a further object of this invention to provide a detachable crane assembly for mounting on pickup trucks and the like including an improved arrangement for facilitating the loading of the crane boom onto the truck and the securing of transportation on the truck.

SUMMARY OF THE INVENTION

Briefly in carrying out the objects of this invention in one embodiment thereof, a detachable crane or hoist for mounting on a pickup truck or similar vehicle is constructed of square tubing to provide a telescoping boom and a base structure for securing the hoist on the truck bed. Stay cables or guys are provided to assure lateral stability, and the boom is arranged to be secured at selected angles to the horizontal including a low or small angle position for use during transportation on the truck. The bottom end of the boom is mounted on a central horizontal track on the base and wheels or rollers on a carriage pivotally secured to the boom end and riding in the track assure easy adjustment and securing of the end of the boom in the various positions. Cable and winch connections and vertical guides are provided for effecting the movement of the boom into position, and a swingable gate rest is provided to be moved into position and locked to engage and hold the boom in its transport position. The base includes lateral bars of tubing extending from the central track member and the rear lateral is provided with sleeves at its outer ends for receiving relatively short horizontal tubing bars which are secured to the truck bed and are adjustable to select the optimum position for attachment. The front lateral is provided with horizontal tubes or sleeves on each side of the center and in alignment with the rear respective sleeves. Long tubing bars are provided which may be secured in the sleeves after removal of the short bars and the long bars are used in moving the hoist into and out of the truck. Jacks and lifting bars may be provided for use with the long bars in moving the hoist assembly.

The features of novelty which characterize this invention are pointed out with particularity in the claims annexed to and forming a part of this specification. The invention itself, however, both as to its organization and its manner of operation, together with further objects and advantages thereof, will best be understood from the following description taken in connection with the accompanying drawings.

BRIEF DESCRIPTION OF THE DRAWINGS

FIG. 7 is a side elevation of the base assembly with its extension post in position;

FIG. 8 is an enlarged front view, partly in section of the bottom end mounting of the boom.

DESCRIPTION OF PREFERRED EMBODIMENT

Figure 1:
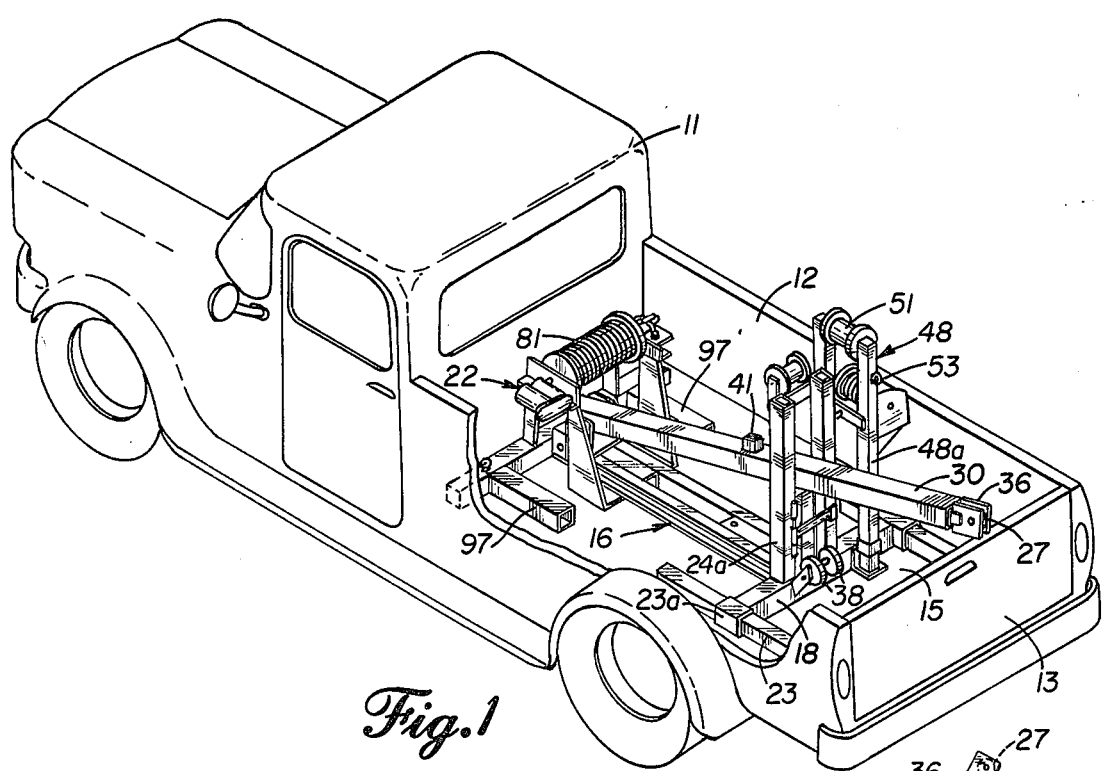
FIG. 1 is a perspective view of a crane embodying the invention mounted in a pickup truck partly broken away.

As illustrated in FIG. 1 a pickup truck 10 having a cab 11 and a box or open top body 12 fitted with a tailboard 13 has a crane or hoist 14 embodying the invention and which is mounted on the bed 15 of the truck. The crane 14 includes a longitudinal central base member 16 comprising two outwardly facing channel members connected by front and rear spacing members 16a and 16b which are welded or otherwise rigidly secured to the channel members. The base further includes a front cross member 17 and a rear cross member 18 which is detachably secured thereto at its opposite end. A crane boom 20 is pivotally mounted on a carriage 21 which is held in tracks along the base member 16 so that it may be moved along the tracks and be anchored in its required position. In FIG. 1 the boom is in its lowered position for transport and the carriage 21 is in its extreme forward position along the tracks. A motor driven winch 22 is mounted on the forward end of the beam 16. To facilitate the attaching of the crane assembly to the bed of the truck, rear longitudinal members 23 are mounted in sleeves at the ends of the cross member 18 so that they may be positioned conveniently for bolting down to the truck bed. An upright post member 24 is secured to the rearward end of the beam 16 and acts as a guide for vertical movement of the boom 20. In the position shown the boom is resting on a stop removably mounted on the post member 24 in a manner described below and which holds the boom above the level of the tailboard 13 so that it may be transported with minimum interference with other vehicles. The winch 22 is provided with a line or cable 25, shown in FIG. 2, which is illustrated as passing over a pulley 26 at the top of the vertical post assembly 24 and thence over a pulley 27 at the outer end of the boom 20 and around to an eye 28 on the boom in which the hook 29 at the end of the line 25 is secured.

Figure 3:
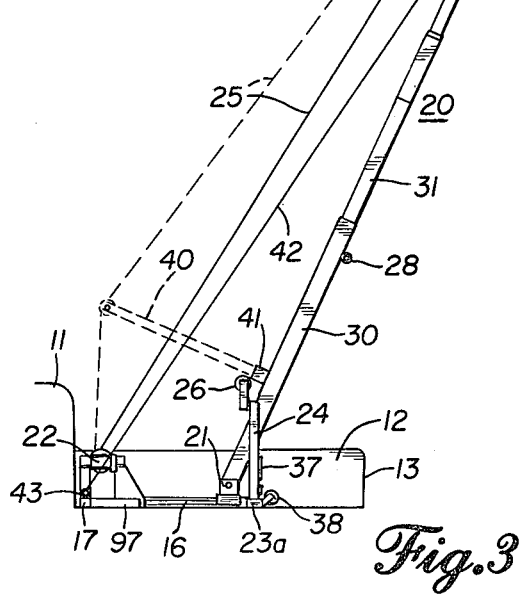
FIG. 3 is a side elevation of the crane similar to FIG. 2 with the crane in an erected position.

The boom 20 is an assembly of four telescoping sections which in their erected operating position are extended as shown in FIG. 3; the boom has been illustrated as extending at an angle of about 65° to the horizontal. This figure shows the basic unit or set up of the joist. The four telescoping sections are indicated at 30, 31, 32 and 33 from the bottom to the top of the boom. The bottom end of the section 30 is pivoted about a horizontal axis on the carriage 21 and the eye 28 is rigidly secured on the lower side of the section near the upper end thereof. The section 32 has a top eye 34 and two side eyes 35 secured adjacent its upper end; these eyes are used for securing guy cables or lines. The pulley 27 is mounted in an assembly 36 at the upper end of the top section 33.

When the crane is to be erected, the tailgate 13 is lowered, the boom rest indicated at 37 in FIG. 3 is swung out of the way and the winch 22 is operated to lower the boom onto rollers 38 which are mounted to the rear of the posts 24, the line 25 is then slackened and the boom moved rearwardly until the carriage is in the position shown in FIG. 3. The carriage is then secured by a pin or bolt extending through a hole 21' in the carriage and into a hole 16' in the rear spacer 16b of the base 16. The boom is then extended and the sections are locked by pinning them in position after their full extension. The hook 29 is then secured to the eye 28 of the section 30 of the boom and the winch is operated to tension the line in readiness for raising the boom. To facilitate raising of the boom a strut 40, indicated in dotted lines, may be mounted in a short sleeve 41 secured to the top of the section 30, and the line 25 run over a slide or roller at the top of the strut as indicated by the dotted line. This provides a more effective leverage for raising the boom. Guy wires or cables 42 are attached to and stretched between the two eyes 35 in readiness to be engaged in eyes 43 which are the outer ends of base member 17. When the boom has been raised beyond the angle to which it is to be erected, the guy wires are attached to the eyes 43 and the boom is lowered against them. The line is then slackened and the hook 29 is detached and the strut 40 is removed. The hoist is then ready for use and may be maneuvered into position by movement of the vehicle, and after a load has been picked up the vehicle may be moved to another position for deposit of the load and in other cases the load may be swung to one side and lowered into position at that side.

Figure 4:
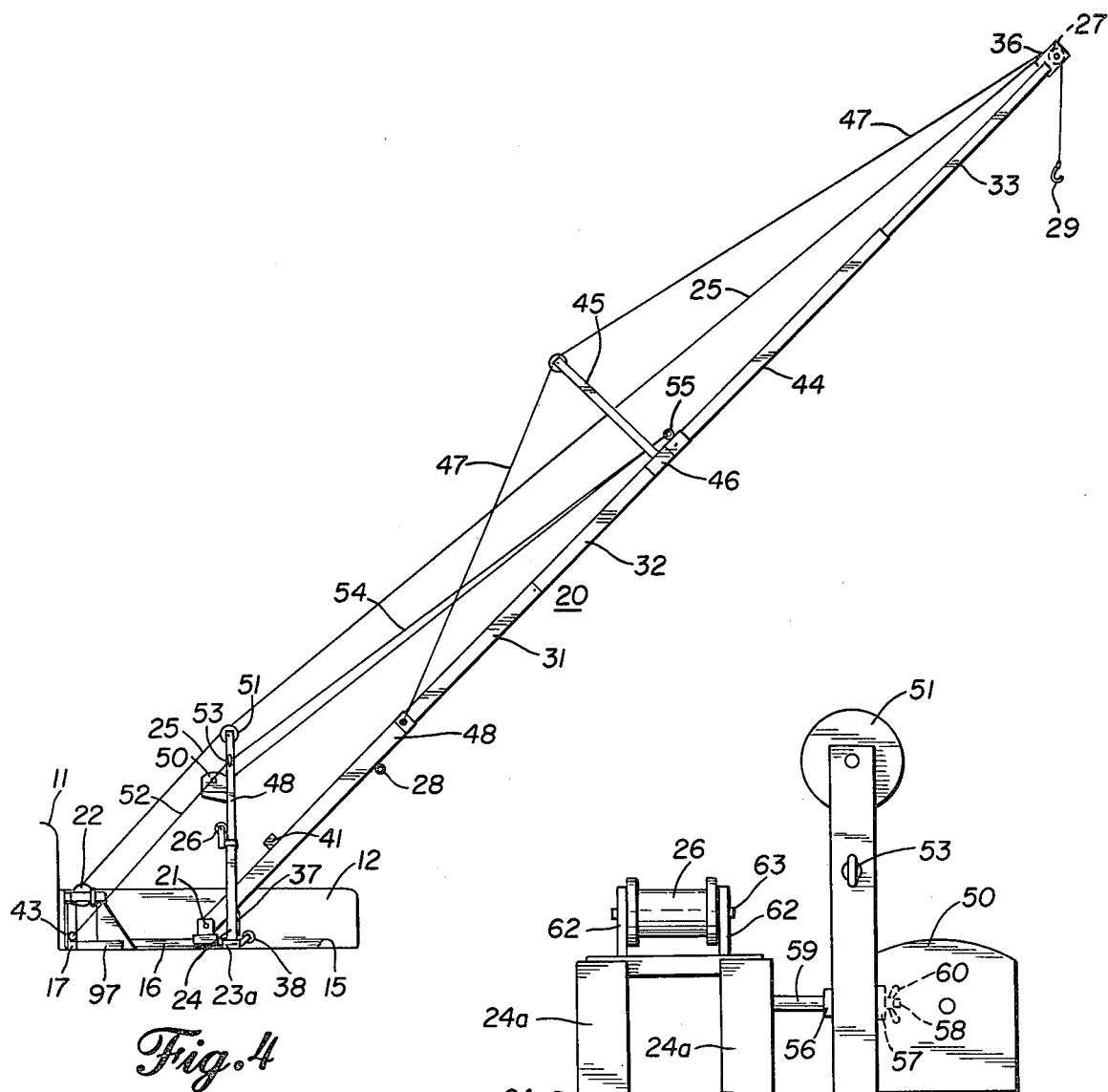
FIG. 4 is a side elevation view similar to FIG. 3 with an extension on the crane boom.

When loads at a greater distance are to be handled by the crane, the boom may be increased in length by adding a section of the same size tubing as the section 33. The crane with the additional section is illustrated in FIG. 4, the added section being indicated at 44 as connected to the section 33 by a sleeve 44'. In order to strengthen the upper portion of the boom, a trussing arrangement is provided which includes a strut 45 having a foot 46 for engagement with the upper end of the section 32. The truss is completed by a cable 47 extending from an eye 47' at the upper end of the section 30 over the outer end of the strut 45 and thence to the top of the section 33 where it is secured to the pulley mounting assembly 36 at the end of the boom. For the purpose of better supporting the long boom, an extension upright 48 is secured on top of the upright 24. The upright 48 has a motor driven winch 50 mounted thereon and a free pulley 51 at its top. The line 25 passes over the pulley 51 and thence to the winch 22. Guy lines or cables 52 are connected to eyelets 53 near the upper end of the post 48 and to the eyes 43 at the ends of the cross member 17 of the base to stabilize the upright post assembly comprising the posts 24 and 48.

An adjustable guy line 54 is provided which extends from one of the eyelets 53 near the top of the post 48 and through an eyelet 55 secured to the top end of the boom section 42 and thence back to the winch 50, the eyelet 55 acting as a guide for the return of the line. This guy line may be used to raise the boom by operation of the winch 50 and also acts as a guy line to retain the boom at the required angle. The adjustable guy line 54 thus may be employed to adjust the angle of the boom as may be required during operation. The hoist line 25 is operated in the same manner as in the above described arrangement of the hoist, the winch 22 being operated in the usual manner.

Figure 5:
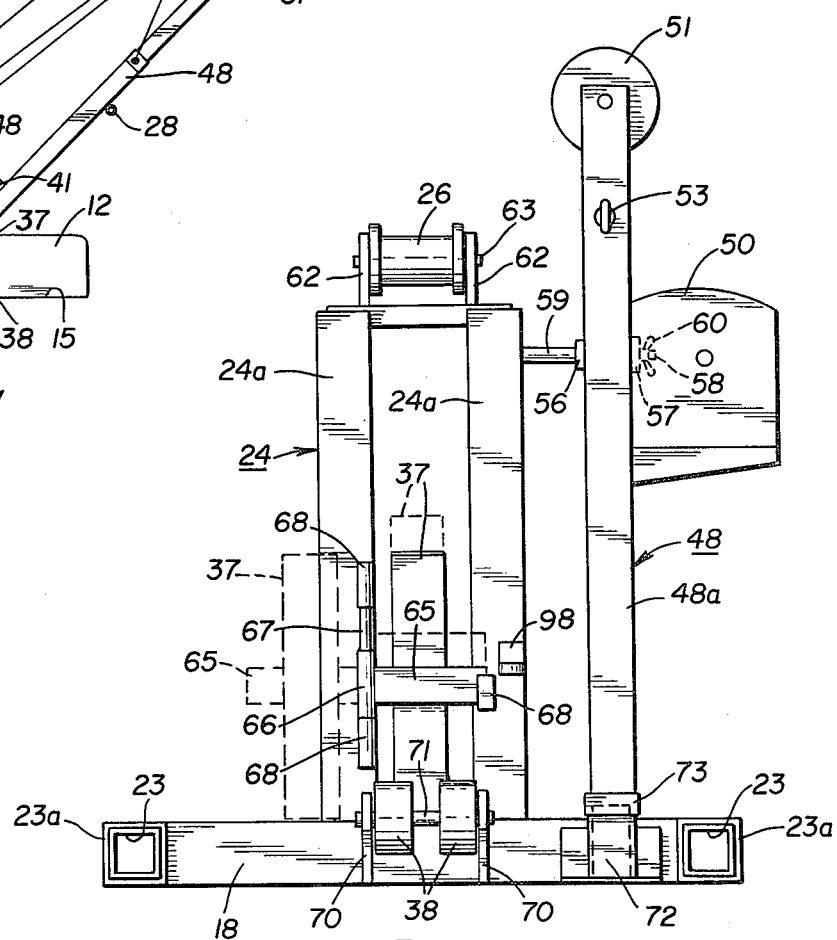
FIG. 5 is an enlarged rear end view of the crane base assembly.
Figure 6:
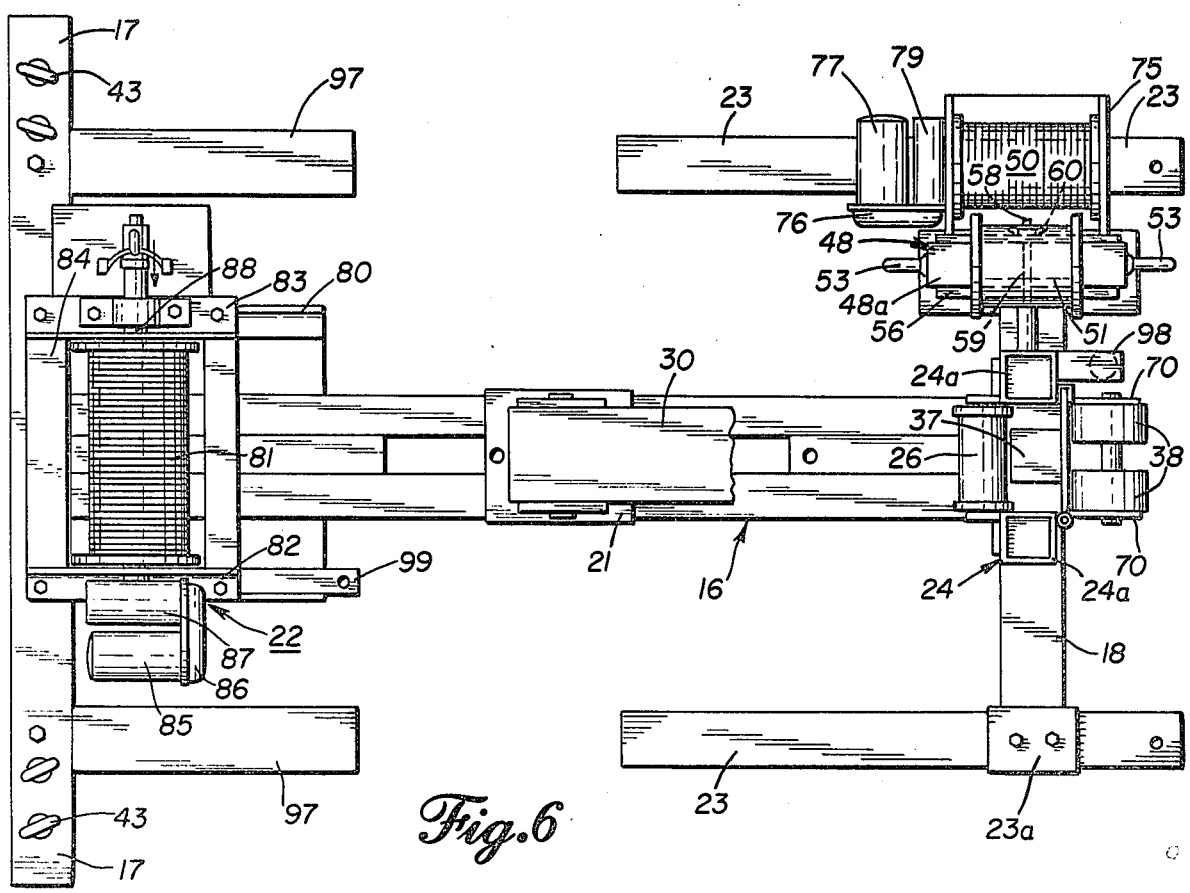
FIG. 6 is a plan view of the base of FIG. 5.

The details of construction of the various components of the hoist assembly are illustrated in FIGS. 5, 6, 7 and 8. In FIGS. 5 and 6 the extension assembly 48 for the upright post assembly 24 is shown secured in its storage position to the right of the assembly 24 as viewed in FIG. 5. The assembly 48 includes two parallel posts 48a which are secured together by side plates 56 and 57 near the top of the posts 48a, these plates being welded to the posts. The foot of the assembly fits in a hole or socket in the base member 18 and the upper portion of the assembly is secured to assembly 24 by a bolt 58 threaded to receive a wing nut 60. A sleeve 59 is placed over the bolt 60 between the post assemblies to act as a spacer.

The assembly 24 comprises two parallel upright posts 24a. These are secured together at their top ends by a strap or crossbrace 61 and the roller or free pulley 26 is mounted on the strap 61 between side plates 62 for rotation about a shaft 63. The boom rest 37 includes a post cut off at an angle as indicated at 64 in FIG. 7 and is secured on a gate member 65 which is mounted on a sleeve 66 which slides on a rod 67 secured between two hinge brackets 68. The angle or slope 64 of the top of the post 37 is cut to provide face engagement with the boom section 30 when the section is lowered to the transport position of the boom shown in FIG. 2. The gate 65 is arranged to be seated and locked in a clip or seat 69 and may be raised to clear the lock and swing the post 37 out of the way to a position such as that shown in FIG. 3 or to swing wide to the position indicated in dotted lines in FIG. 5. The raised position of the post 37 is also indicated in dotted lines. The wheels 38 for facilitating installation and removal of the boom are mounted between brackets 70 which are welded to the cross member 18 of the base and carry a shaft 71 on which the wheels are mounted.

When the post assembly 48 is removed from its position for storage upon release of the wing nut 60, it is placed on top of the assembly 24 and the feet at the bottom ends of posts 48a are fitted within the tops of the posts 24a in position against stops 73 rigidly secured to the lower end of the posts 48a. The assembly 48 in its mounted position is illustrated in FIG. 7. In this position the upright post assemblies are stabilized against lateral movement by guy members shown as chains 74 which are secured to the eyelets 53 of the posts 48a and to eyelets 43 at the ends of the base member 17. The winch 50 as shown in FIG. 7 is mounted on the posts 48a on sideplates in which the winch spool or drum 76 is rotatably mounted. The spool is driven by a motor 77 through gearing in boxes or casings 78 and 79; these boxes constitute the motor mounting, the box 79 being rigidly secured to the adjacent plate 75, and the box 78 supporting the motor 77 on the casing 79.

The winch 22 is mounted on the base 16 on a plate structure including generally triangular side plates 80 and the spool or drum for the winch, indicated at 81 is mounted between brackets 82 and 83 carried at one end by the plates 80 and at the other by a wall 84 mounted on the base 17. The driving motor indicated at 85 is secured to the bracket 82 by gear casings 86 and 87 through which the shaft 88 of the winch is driven.

Figure 2:
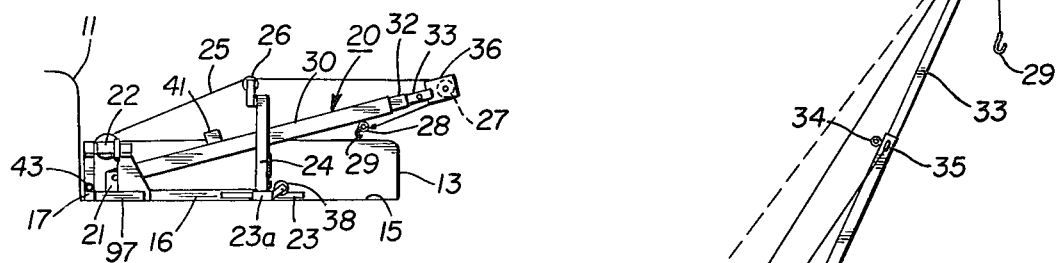
FIG. 2 is a side elevation of the crane of FIG. 1 with a portion of the truck in outline.

The boom, which is attached to the base 16 in front of the assembly 24, has not been shown in FIG. 5; the lower portion of the boom is shown in FIGS. 6 and 7. In FIG. 6 the carriage 21 has been shown midway between the ends of the base 16, this being a position between the extreme positions of the boom as indicated in FIGS. 2 and 3, which is an intermediate position during the movement of the boom from its lowered position to its position for erection in the manner described above. FIG. 8 is a view partly in section of the lower end of the boom when in the position illustrated in FIG. 7. The carriage 21 as illustrated in this figure comprises a base member 90 having downwardly turned sides 91 on which wheels or rollers 92 are mounted, there being a pair of wheels on each side of the carriage as shown in FIG. 7. The boom is secured to the carriage in a seat or bracket 93 on a pivot shaft 94 which passes through the boom and is secured in the walls 93. The top wall of the base 90 is provided with the hole 21' shown in FIG. 6 which may be positioned in registry with the hole 16' in the top of the base member 16b and will receive the bolt or pin indicated at 21" for securing the carriage 21 in position for operation of the crane. The carriage 21 is placed on the base 16 with the wheels in the longitudinal channel members, indicated at 95, which open outwardly, the carriage being placed over the member 16 from the rear end thereof when the rear cross member 18 is detached. The wheels are of a diameter less than the spacing between the top and bottom walls of the channels 95 and ride on the lower walls of the channel. If the wheels are raised during movement of the boom from one position to another they will engage the top walls and roll along the top walls. This arrangement of the carriage and the wheels makes it easy to move the boom into its required position and also facilitates the removal of the boom from the base assembly. The wheels and their free engagement with either the top or bottom walls of the channels effectively prevent jamming or lodging of the boom during its movement. Carriage 21 cooperating with the rollers 38 provides a low friction support of the boom at all times during the movement of the boom during its erection and during takedown and also during initial assembly and dismantling for storage.

Figure 9:
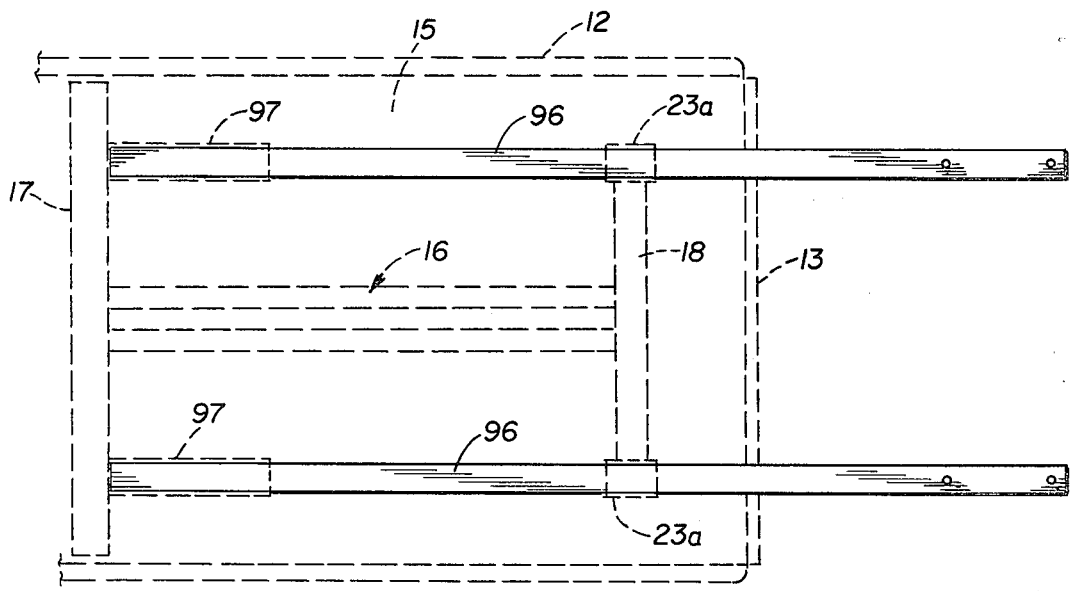
FIG. 9 is a plan view of a pair of loading bars with the truck bed and other crane parts indicated in dotted lines.

The base 16 is securely attached to the truck bed by bolts which pass through holes in the members 17 and 23, the members 23 affording longitudinal adjustment of their position to select the most advantageous position for attachment to the truck bed. The sleeves 23a are also positioned to receive long members or bars 96 shown in FIG. 9 and which are of the same cross sectional size as the members 23 and which are extended rearwardly in sleeves 97; these latter sleeves are welded or otherwise securely and rigidly attached to the base member 17 in positions in alignment with the sleeves 23a. Thus the long bars may be positioned securely within the sleeves 23a and 97 and may extend beyond the end of the truck bed, the tailboard being lowered for this purpose. By way of example, the long bars placed in the sleeves 23a and 97 which extend over the rear end of the truck may be provided with pivoted lifting legs which engage the ground at an angle so that in accordance with known practice, movement of the truck will pivot the legs and lift the rear ends of the bars and thus raise the rear of the base secured to the bars, suitable stops being provided to limit the pivotal movement of the legs with respect to the bars. The base may then be lifted from the truck by an overhead rigging (not shown) attached to the forward portion of the base and the truck driven away so that the crane assembly may be lowered onto a suitable support. The overhead rigging may be another crane or a block and tackle supported on a gantry-like arch extending over the truck body and supported on the ground along the sides of the truck.

For the purpose of raising the crane assembly from the truck bed, two jacking bars or stops are provided, the first of these is indicated at 98 welded or otherwise suitably secured to the right-hand post 24a as viewed in FIG. 5 and the second one indicated at 99 is a bar rigidly attached to the support 80 for the winch 22. These stops will facilitate the jacking up of the base during the positioning of the base on the truck bed.

While the invention has been described in connection with a specific arrangement and type of mechanism, various other modifications and applications may occur to those skilled in the art. Therefore, it is not desired that the invention be limited to the specific details illustrated and described and it is intended by the appended claims to cover all modifications which fall within the spirit and the scope of the invention.

We claim:

1. In a hoist of the type which is adapted for detachable mounting on the bed of a pickup truck or similar vehicle and which includes an elongated flat base for engagement with and attachment to the truck bed, a boom having its base end pivotally attached to a member mounted for limited movement fore and aft along the longitudinal axis of the flat base, said boom being adapted for swinging movement in a vertical plane with its axis normal to the longitudinal axis of the base, means for securing said member to the base in its aft position, the combination with:

means for erecting the boom,
    means including an upwardly extending guide structure secured to said base and including guide posts one on either side of the boom for restraining the boom against lateral movement and for guiding the boom during erection and during lowering, and
    a detachable stop secured to said posts for providing a rest for engagement with the underside of the boom to support the boom in its lowered position for transportation.

2. A hoist as set forth in claim wherein said stop comprises a gate hinged on one of said posts and swingable into position for engaging the other post, and means for locking said gate in its position of engagement with said other post.

3. A hoist as set forth in claim 1 or claim 2 including the further combination with a roller mounted on said base rearwardly of said posts and in position to engage the bottom of said boom when lowered after removal of said stop for facilitating the movement of said boom toward and away from its position of attachment of said member.

4. A hoist as set forth in claim 1 including the further combination with a longitudinal track secured to said flat base in alignment with said boom and wherein said pivotal attaching member includes a set of wheels engaging said track and means for maintaining said wheels in position for engagement with said track, said wheels being adapted to facilitate the erection, guiding and lowering of said boom.

5. A hoist as set forth in claim 4 wherein said base includes a longitudinal track for said member, said track including a pair of channels secured in back to back relationship, and wherein said member comprises a body having side elements extending downwardly over said channels in spaced relationship and having wheels mounted for rotation thereon and positioned in respective ones of said channels for rolling movement along the bottom walls of the channels, the bottom end of said boom being pivotally secured to said body and the upper sides of said channels constituting said means for maintaining said wheels in position.

6. A hoist as set forth in claim 1 including the further combination with an extension guide post structure adapted to be detachably mounted on the top of said guide posts and comprising two additional guide posts and having a sheave at the top thereof for receiving the hoisting cable for facilitating the raising and lowering of said boom, and guy lines secured between the upper portion of said extension structure and said base for stabilizing said structure against lateral movement.

7. A hoist as set forth in claim 6 including the further combination with a second winch mounted on said extension structure and having a second hoisting cable, means for connecting said second hoisting cable to said extension structure, a cable guide member secured to said boom remote from said structure whereby said second hoisting cable may be passed from said winch through said guide member and back to said structure and be secured thereto, said second winch and said second cable being adapted to position said boom and providing an adjustable guy line for the upper portion of said boom.

8. A hoist as set forth in claim 10 including the further combination with a pair of sockets provided in said base at one side of said upright structure and adapted to receive the posts of said extension structure for storage, and means for securing the upper portion of said extension structure to said upright structure for stabilizing said extension structure in its storage position.

9. In a hoist of the type which is adapted for detachable mounting on the bed of a pickup truck or similar vehicle and which includes a flat base for engagement with and attachment to the truck bed, a boom having its base end pivotally attached to a member mounted for limited movement fore and aft of the flat base, means for securing said member to the base in its aft position, means for erecting the boom and means for restraining the boom against lateral movement, the combination with:
- a pair of sleeves each secured to said base on a respective side thereof adjacent the aft end of the base and extending longitudinally of the base,
- a first pair of longitudinally bars slidably mounted in said sleeves and including means for rigidly securing the bars to the bed of the truck to secure the base to the bed; and
- a second pair of bars interchangeable with said first pair and of lengths sufficient to extend from the forward end of said base rearwardly and beyond the end of the vehicle, and means on the forward end of said base for retaining the ends of the bars of said second pair whereby said second pair of bars is adapted to facilitate the lifting and removal of said hoist from the vehicle.

10. The invention of claim 9 including the further combination with jacking members pivoted to the rear ends of the bars of said second pair and adapted to engage the ground for lifting said bars upon movement of the vehicle.

11. In a hoist of the type which is adapted for detachable mounting on the bed of a pickup truck or similar vehicle and which includes an elongated flat base for engagement with and attachment to the truck bed, a boom having its base end pivotally attached to a member mounted for limited movement fore and aft along the longitudinal axis of the flat base, said boom being adapted for swinging movement in a vertical plane with its axis normal to the longitudinal axis of the base, means for securing said member to the base in its aft position, means for erecting the boom and means for restraining the boom against lateral movement, the combination with;
- an upwardly extending guide structure secured to said base and including guide posts one on either side of the boom for guiding the boom during erection and during lowering, and
- a winch secured to said base and having a hoisting cable, said boom having a sheave at the outer end thereof for receiving said cable and including a roller at the top of said guide post structure for receiving said hoisting cable whereby the cable may pass from the winch over said roller and thence over said sheave and be secured to said boom and the vertical position of said boom may be adjusted by operation of said winch.

* * * * *